United States Patent [19]
Thomason

[11] Patent Number: 5,102,086
[45] Date of Patent: Apr. 7, 1992

[54] ADAPTABLE CUP HOLDER

[76] Inventor: Raymon Thomason, 3415 Danbury, Amarillo, Tex. 79109

[21] Appl. No.: 712,449

[22] Filed: Jun. 10, 1991

[51] Int. Cl.⁵ ............................................. A47K 1/09
[52] U.S. Cl. .................................................. 248/311.2
[58] Field of Search .............. 248/311.2, 310, 346.1, 248/231.4, 231.7, 146

[56] References Cited

U.S. PATENT DOCUMENTS

| | | | |
|---|---|---|---|
| D. 288,054 | 2/1987 | Schulte et al. ...................... | D7/70 |
| D. 304,007 | 10/1989 | Davis .................................... | D7/70 |
| 3,306,566 | 2/1967 | Paulson et al. ...................... | 248/311.2 X |
| 4,036,463 | 7/1977 | Hopkins et al. ..................... | 248/311.2 X |
| 4,286,742 | 9/1981 | Pellegrino ........................... | 224/281 |
| 4,655,425 | 4/1987 | Wallace et al. ..................... | 248/311.2 |
| 4,795,211 | 1/1989 | Stern et al. .......................... | 248/311.2 X |
| 4,887,784 | 12/1989 | Kayati ................................. | 248/311.2 |
| 4,984,722 | 1/1991 | Moore .................................. | 224/42.43 |

Primary Examiner—Alvin C. Chin-Shue
Attorney, Agent, or Firm—Laney, Dougherty, Hessin & Beavers

[57] ABSTRACT

A cup holder assembly that includes a unitary holder body formed internally with a multiple of seating rings and including a threaded base member with partially open grating structure and a plastic cap member for secure affixture over the base member. The holder body is then suitably secured to a selected form of clamp to provide means for positioning the cup holder relative to a work space, driving seat or the like.

5 Claims, 2 Drawing Sheets

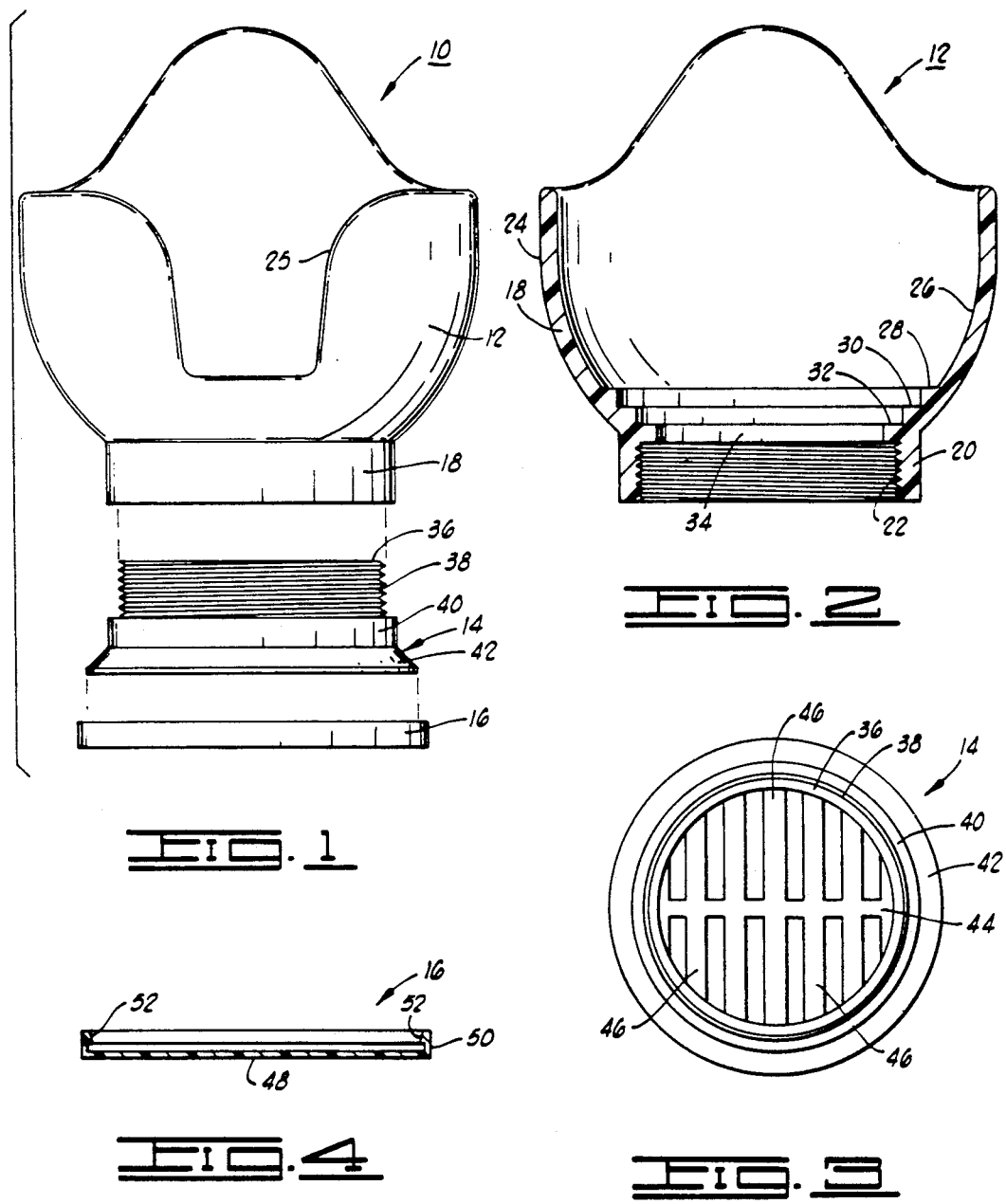

ADAPTABLE CUP HOLDER

BACKGROUND OF THE INVENTION

1. Field of the Invention

The invention relates generally to a cup holder that is adaptable for positioning at a work desk, in an automobile or the like and, more particularly, but not by way of limitation, it relates to an improved manufacture and construction of such a cup holder to enable versatility in manufacture and use.

2. Description of the Prior Art

The prior art includes numerous types of cup holder and the classification for the particular invention may well be termed a crowded art. Patent searching revealed a great number of cup holder types that answer the broad, general description; however, the invention lies in particulars of construction. Representative prior art U.S. patents are presented herewith by means of the Information Disclosure Statement.

SUMMARY OF THE INVENTION

The present invention relates to improvements in construction of cup holders of the type that may be affixed to articles in the surround thus enabling usage in any of various places. In particular, the cup holder of the present invention is adaptable for affixture to a table edge or the like and it is readily usable on or around an automobile dashboard. The cup holder consists of a unitarily formed plastic holder shaped generally as a body of revolution about a vertical axis and having a thickened front portion and a cut-out rear wall that accommodates a cup handle. A base member with grating assembly having partially open bottom surface is screw-fit into the bottom of the holder, and a pliable plastic cap may be secured thereover to prevent drip of material from the cup holder. A suitable clamp or fastener assembly is then removably affixed to the thickened front portion of the holder unit. Clamp assemblies of various types may be utilized, depending upon the surface or protrusion that is available for securing. The clamps utilized as shown are C-type clamps having varying jaw surface and configuration.

Therefore, it is an object of the present invention to provide a versatile cup holder assembly that may be used in any of various surrounds.

It is also an object of the present invention to provide a cup holder assembly that requires few operations in manufacture.

It is yet further an object of the present invention to provide a cup holder that is economical of manufacture and reliable in usage.

Finally, it is an object of the present invention to provide a cup holder that may be used to provide secure seating to any of several sizes of drinking cup while allowing gripable handle access.

Other objects and advantages of the invention will be evident from the following detailed description when read in conjunction with the accompanying drawings which illustrate the invention.

BRIEF DESCRIPTION OF THE DRAWINGS

FIG. 1 is a front view in exploded form of the cup holder;

FIG. 2 is a vertical cross section of the holder body;

FIG. 3 is a top plan view of the base member of the cup holder assembly;

FIG. 4 is a vertical cross section of the cap member of the cup holder assembly;

DETAILED DESCRIPTION OF THE INVENTION

Figure 5:
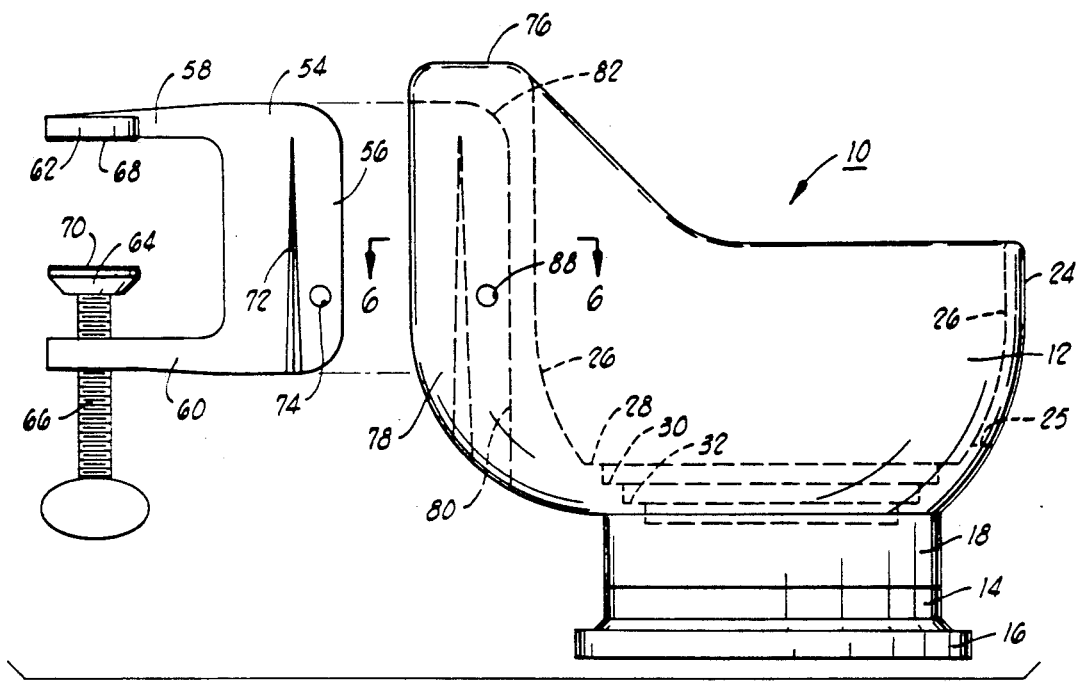
FIG. 5 is a side view in elevation of the cup holder with a first clamping structure.

Referring to FIGS. 1 and 2, a cup holder assembly 10 consists of a holder body 12, a lower base member 14 and a cap member 16. The holder body 12 is formed generally as a body of revolution 18 about a vertical axis and having a lower collar 20 having internal threads 22 formed thereon. The body of revolution 18 is formed with an outer surface 24 and an inner surface 26 that terminates adjacent lower collar 20 in a series of step-like surfaces 28, 30 and 32, each having a diameter to fit the base of one size of more-or-less standard drinking cup. A front cut-out portion of body 18 provides cup handle access. Body 18 and lower collar 20 are also of a diameter suitable for reception in standard sized console cupholders.

The area within step surface 32 and cylindrical wall 34 is open for communication with the base member 14. See also FIG. 3. Base member 14 includes a collar 36 having external threads 38 which are received in mating engagement up within internal threads 22 (FIG. 2). Cap member 14 is unitarily formed to extend a shoulder 40 and flange 42 below the collar 36. As shown in FIG. 3, the interior of shoulder 40 is formed with a partially open grating or grid consisting of a spacing bar 44 and a plurality of 90° oriented, parallel grid bars 46. The base member 14 is also a unitarily formed part that is molded from a suitable plastic such as ABS, PVC or other selected plastic.

FIG. 4 defines construction of the cap member 16 as it is a unitarily molded formation formed from a suitable pliable plastic such as polyethylene. Cap member 16 includes a lower, circular surface 48 formed into a shallow, cylindrical side wall 50 having in inwardly turned gripping lip 52 formed therearound. The lower surface of bottom surface 48 may have textured or gripping surface formed thereon to aid in seating when the cup holder assembly 10 is used in a sitting position without aid of clamping. As shown in FIG. 1, the holder assembly 10 is assembled by screwing the base member 14 into the bottom of holder body 12, i.e., within lower collar 18. Thereafter, the cap member 16 may be secured over flange 42 to guard against loss of drip material to surfaces below.

Figure 6:
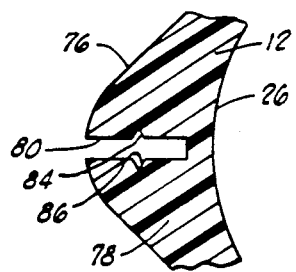
FIG. 6 is a section taken along lines 6—6 of FIG. 5.

FIGS. 5 and 6 illustrate the holder body assembly as used with a first type of clamp assembly 54. The clamp 54 includes a blade 56 having spaced, upper and lower arms 58 and 60 with a suitable gripping pad 62 formed on upper arm 58. A lower gripping pad 64 is journally secured on the end of a thumb screw 66 that is threaded through lower arm 60. The upper and lower pads 62 and 64 are arrayed in alignment and may include resilient gripping surfaces 68 and 70, respectively, bonded thereon. The blade 56 includes a V-shaped guide 72 formed on each side and a locking hole 74 is formed for mating engagement, as will be further described.

The front portion 76 of holder body 12 (see FIG. 6) is formed as a thickened portion 78 along the front vertical edge of the holder body 12. A vertical slot 80 is formed from the lower edge of front portion 76 up to a terminus 82, and it may be noted that the shape of slot 80 is formed for mating engagement with the blade 56 of clamp 54. Thus, slot 80 also includes opposite side grooves 84 and 86 for receiving elongated guides 72 upward therein and a hole 88 is formed for alignment with the hole 74 in clamp 54.

When clamp 54 is slid upward within slot 80 and seated against terminus 82, the opposite side guides 72 will be firmly seated within the opposite side grooves 84, 86 and holes 74 and 88 will be in alignment. A suitable key (not shown), e.g. a quick action thumb screw, dowel pin or the like, may be inserted through the aligned hole 74, 88 to provide locking in the operative position. Thereafter, thumb screw 66 can be operated to securely position the opposed pads 62 and 64 in gripping relationship to a selected surface. This type of clamp 54 is particularly suited for table edge clamping such as in accompaniment to a work space or computer table; however, there are various surfaces in and about an automobile dashboard that will provide support for the clamp 54. Actually, about anything with the appropriate size horizontal member will support the clamp cup holder assembly 10.

Figure 7:
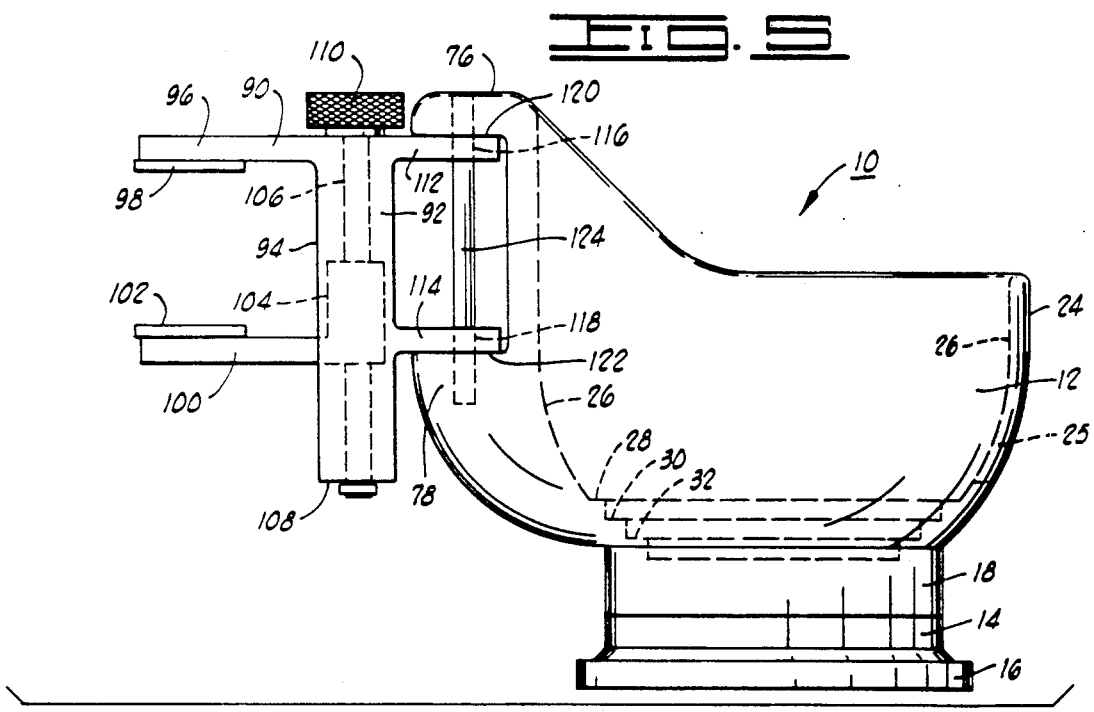
FIG. 7 is a side view in elevation of the cup holder with an alternative form of clamping assembly.

FIG. 7 illustrates a cup holder assembly 10 with a somewhat different type of clamp 90, as affixed to the cup holder by a swivel arrangement. Thus, clamp 90 consists of a clamp body 92, a U-shaped channel member that is open at side 94. The clamp body 92 extends an upper arm 96 with gripping pad 98, and a lower clamp arm 100 with gripping pad 102 extends from a traveling block 104 which is threaded to ride in clamp body 92 on a journaled thumb screw 106. The thumb screw 106 is journaled for rotation in the base end 108 of clamp body 92 and a knurled knob 110 at the top end of the clamp assembly provides means for manipulation.

The back side of clamp body 92 extends upper and lower support flanges 112 and 114 having aligned holes 116 and 118, respectively, formed therethrough. The body front portion 76 is relieved to provide a transverse opening consisting of upper surface 120 and lower surface 122 which receive support flanges 112 and 114 as a removable pivot pin 124 positions the clamp 90 in swivel relationship to cup holder body 10.

Operation of the assembly of FIG. 7 is similar to that of FIG. 5 albeit that the clamp 90 affords somewhat larger bite in the securing function while also allowing a swivel movement to the cup holder body 10. The pivot pin 124 is preferably of a type which would include a gripping head or other structure (not shown) that would allow easy removal in the event that the holder assembly 10 was otherwise supported as by placement on a flat surface or within a previously existing cup holder, e.g. an auto console cup well. It should be readily understood that different clamping or holding devices may be utilized in combination with the cup holder body, and special fixtures may be required for particular situations.

Changes may be made in combination and arrangement of elements as heretofore set forth in the specification and shown in the drawings; it being understood that changes may be made in the embodiments disclosed without departing from the spirit and scope of the invention as defined in the following claims.

The embodiments of the invention in which an exclusive property or privilege is claimed are as follows:

1. A cup holder device comprising:
    a holder body having a generally bowl-shaped sidewall and open bottom formed as an internally threaded circular collar, and having a plurality of different diameter circular shoulders formed about the inner sidewall adjacent said circular collar whereby different cup diameters can be accommodated, said holder body sidewall having a thickened front portion and a U-shaped cut-out back portion;
    a base member having a flat bottom panel and being formed upward into an externally threaded collar for mating engagement within the side wall circular collar, said bottom panel having a partially open grating structure formed centrally thereof;
    a pliable plastic cap member of circular shape with an outer rim and lip for reception over said flat bottom panel of the base member; and
    clamp means secured to the holder body front portion for securing the holder body at a selected location.

2. A cup holder device as set forth in claim I wherein said clamp means comprises:
    an adjustable C-type clamp that is detachably affixed to said holder body front portion.

3. A cup holder device as set forth in claim 1 wherein said clamp means comprises.
    an elongated channel member extending an upper clamp arm and a means for movable affixure to said holder body front portion;
    a screw member journaled for rotation within said channel member and having a rotation control knob; and
    a threaded block extending a lower clamp and being retained on said screw member for controlled movement along said channel member.

4. A cup holder device as set forth in claim 1 wherein:
    said holder body is unitarily formed by molding from selected plastic.

5. A cup holder device as set forth in claim 2 which is further characterized to include:
    a slot formed in the thickened front portion of the holder body to receive a portion of said C-type clamp therein in mating engagement; and
    locking means for fastening said portion of the C-type clamp.

* * * * *